April 18, 1961     W. B. RASMUSSEN     2,980,302
METERING LIQUID DISPENSER
Filed Dec. 9, 1957     2 Sheets-Sheet 1

INVENTOR.
WILLIAM B. RASMUSSEN
BY Robinson & Berry
ATTORNEYS

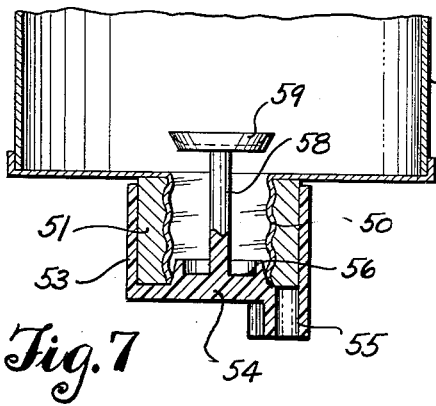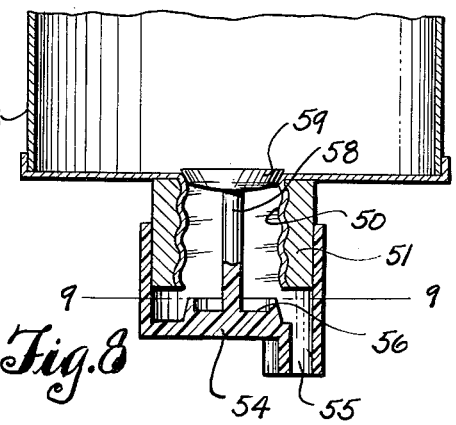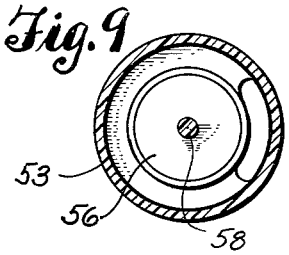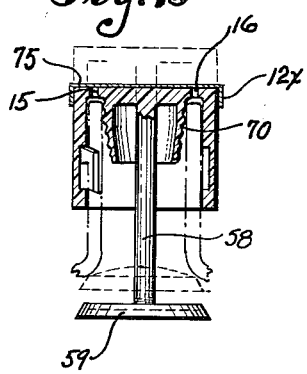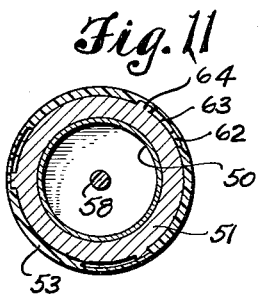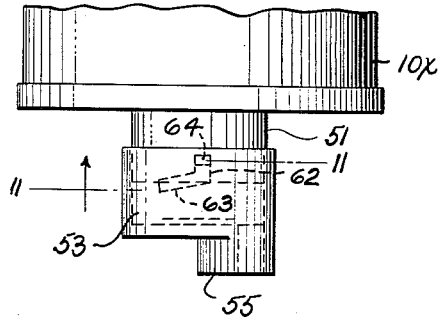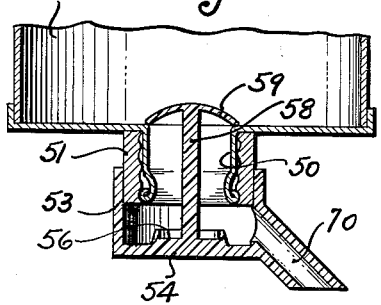

United States Patent Office 2,980,302
Patented Apr. 18, 1961

2,980,302
METERING LIQUID DISPENSER

William B. Rasmussen, 1915 Benson Ave., Prosser, Benton County, Wash., assignor of one-half to Alvin G. Ash, Tacoma, Wash.

Filed Dec. 9, 1957, Ser. No. 701,619

2 Claims. (Cl. 222—453)

This invention relates to devices for the dispensing of liquids from their containers in accurately metered amounts, and it has reference more particularly to a novel form of "dispensing cap" that is applicable to a companion container and whereby the contents of the container can be dispensed in specific measured amounts.

This application is a continuation-in-part of my pending application filed on September 20, 1955, under Serial No. 535,412, now Patent No. 2,864,538.

The problem of providing a device for attachment to a container of fluid material whereby just so much material can be poured from the container with each dispensing operation is an old one for which many solutions have been offered. Particularly in the dispensing of hard liquors and the like, many solutions for the problem have been proposed from relatively simple ball valve operated caps to elaborate weighted chambers movable into opened and closed positions in response to a tilting motion or the tilting to a pouring position of the container to which the dispensing cap is attached. Many of these devices, although rather expensive, have been successful and continue to be used as caps for bottles and the like wherein initial expense is not a great problem and the caps utilized may be transferred from bottle to bottle as the bottles are emptied.

It is the principal object of this invention to provide a novel dispensing cap for liquid containers, especially of the throw-away type, which adapts itself to the dispensing of the liquid in predetermined amounts; and which cap also is long lasting and will perform readily and effectively.

Another object of the present invention is to provide a dispensing cap of the above character, that can be easily and readily applied to its companion container and which will automatically fill with a predetermined quantity of fluid from the container upon the tilting of the container as for pouring, and which cap has a novel valve member associated therewith that can be easily and readily adjusted by movement of the cap to cause the dispensing of the specific measured amount from the cap.

A further object of the present invention resides in the the provision of novel metering dispenser cap constructions for containers which may be inexpensively mass produced; to serve on liquid detergent containers and the like for dispensing measured quantities of detergents from such containers in accordance with instructions for the use of such detergents, or soaps, and as well as other materials, in dishwashers, washers, etc. Also, such caps may be utilized with containers for the dispensing of almost any liquid material which it is desirable to dispense in measured quantities.

Further objects and advantages of the invention reside in the various details of construction and combination of parts, and in their mode of use as will hereinafter be fully described.

In accomplishing the above mentioned and other objects of the invention, I have provided the improved details of construction, the preferred forms of which are illustrated in the accompanying drawings, wherein:

Fig. 7 is a cross-sectional view of a dispensing cap of an alternative construction as adapted for use with containers of a different form; the cap being shown as adjusted to a position for filling.

Fig. 8 is a view similar to that of Fig. 7, but showing the cap as adjusted to its dispensing position.

Fig. 9 is a cross-section on line 9—9 in Fig. 8.

Fig. 10 is a side view of the cap, showing certain parts of the cap securing means; the cap being shown in "dispensing" position.

Fig. 11 is a cross-section taken on line 11—11 in Fig. 10.

Fig. 12 is a sectional view of a dispenser of an alternative form, embodied by this invention.

Fig. 13 is a sectional detail showing a simplified form of dispenser of yet another form.

Figure 1:
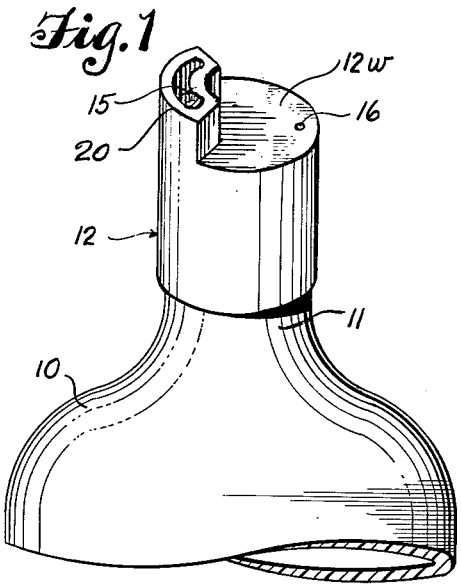
Fig. 1 is a perspective view of the upper end portion of a container of bottle form as equipped with a dispensing cap embodied by the present invention.

Referring more in detail to the drawings, and particularly to the device as illustrated in Figs. 1 to 6 inclusive.

10 designates the body portion of a bottle-like container of a dispensable fluid material, usually a liquid, but not necessarily confined thereto, and 11 designates the neck portion of the container; this latter part being truly cylindrical and open to its full diameter at its upper end.

Fitted about the neck portion 11, for limited longitudinal movement and rotary adjustment thereon as presently described, is the present dispensing cap designated in its entirety by numeral 12; this cap being of sleeve-like form and closed at its outer end by a wall 12w that is formed centrally on its inside surface with an extended, slightly tapered plug portion 13 adapted to be wedgingly received in the open end of the neck 11, as in Fig. 12, to effect a liquid and air tight seal.

Formed in the end wall 12w along the periphery of the plug portion and extending through an arc of about 90°, is a dispensing slot 15. Diametrically opposite the slot, the end wall has a small air port 16 formed therethrough; this port being closed by the end of neck 11 when the cap is in "closed" position.

Figure 2:
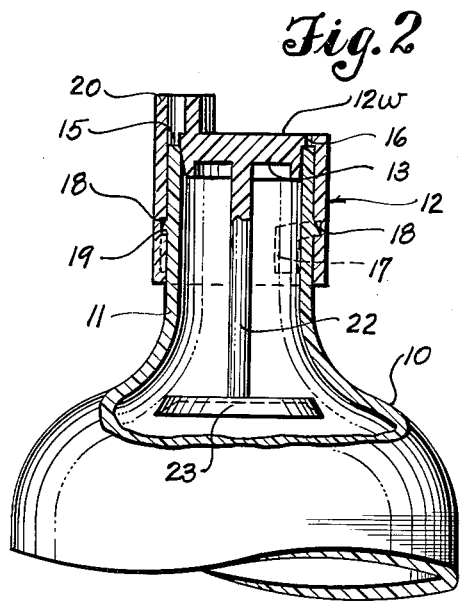
Fig. 2 is a view showing the present dispensing cap in axial cross-section and as applied to the container and in closed position.
Figure 4:
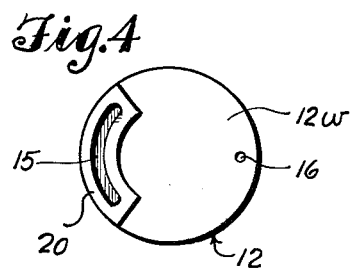
Fig. 4 is an upper end view of the dispensing cap.
Figure 5:
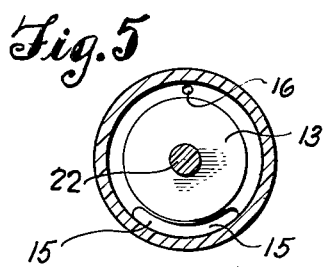
Fig. 5 is a cross-section taken on line 5—5 in Fig. 3.
Figure 6:
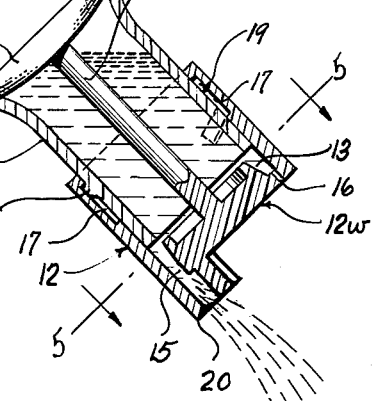
Fig. 6 is a detail illustrating the form of the cap retaining and locking channels formed in the cap wall.
Figure 6A:
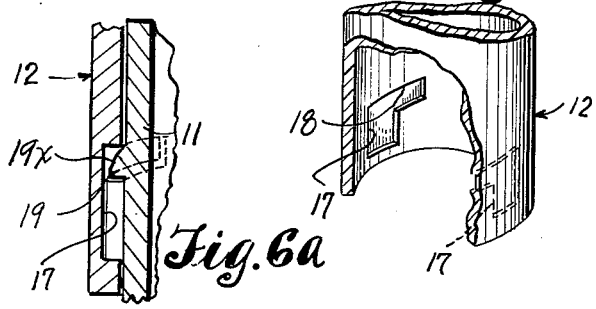
Fig. 6a is a sectional detail of parts of the cap and container neck, enlarged for clarity and showing a locking lug on the cap.

Formed in the inside wall surfaces of the cylindrical cap, near its inner end, as seen in Figs. 2 and 6a, are a plurality of longitudinal channels 17, each having a lateral channel 18 leading from its upper end in an upwardly inclined direction. Formed on the neck portion 11 of the container are small outwardly projecting lugs, or keys 19 which are slidably contained in the corresponding channels 17 as means for limiting the closing and opening movements of the cap on the bottle neck and movable into the lateral channels for locking the cap when closed. Upon adjustment of the dispenser to what is referred to as the "closed" or "container sealing position" with the plug portion 13 extended into the outer end of the neck, as shown in Fig. 2, rotative adjustment thereof causes the lugs 19 to enter the slots 18 to secure the spout. It is also a feature of the slot and lug combination that the slots 18 are slightly spirally directed and thus as the lugs 19 move therealong they will operate to draw the plug tightly into a sealing position, and hold the cap against release until it is turned back to align the lugs 19 with the channels 17.

It has been shown best in Fig. 6a, that the lugs or keys 19 have beveled top surfaces as at 19x. The purpose of this is to make it easily possible for the cylindrical wall portion of cap 12, which is of a molded plastic or similar flexible material; to be applied to the neck 11 by merely forcing it downward over these lugs. The resiliency of the material from which the parts are formed permitting this mode of easy assembly.

At its outer end the cap is formed with a short pouring extension or spout 20 surrounding the dispensing slot 15. This spout serves as an aid in directing the liquid as poured from the cap.

Fixed to the end wall 12w of the cap, centrally thereof and extending therefrom into the container coaxially of the neck portion is a stem 22 which, at its inner end is equipped with a thin, resilient valve disk 23 that is adapted to move in accordance with the longitudinal movements of the cap, from and against a valve seat formed at the entrance from the body 10 into the neck of the container. When the cap is in container sealing position, as in Fig. 2, the valve will be unseated or open and when it is in its dispensing position, as in Fig. 3, the valve will be closed against the valve seat.

With the container 10 so equipped with the dispensing cap, use of the cap is as follows: Assuming that the container is in position of Fig. 2 awaiting use, the cap is usually closed and the plug 13 is pressed into the outer end of the bottle neck.

When it is desired to dispense the predetermined measured amount of liquid from the container 10, the container is inverted, allowing the neck portion 11 to be filled with liquid. Then the cap 12 is adjusted from its sealing or closed position, outwardly on the neck to the extent limited by the lugs 19, thus causing the valve 23 to be seated as in Fig. 3 to prevent any additional flow from the container into the neck. The measured liquid content of the neck then flows out through the cap outlet 15. This dispensing adjustment of the cap causes the uncovering of air port 16, allowing air to enter and facilitate a quick dispensing operation. If an additional measured amount is desired, the cap can be adjusted back to closed position for refilling without requiring that the bottle or container be returned to upright position. After dispensing, the container may then be brought back to upright position and closed by moving the cap downwardly on the neck to the position of Fig. 2. This seals the container and places the cap in readiness for refilling by tilting or by inversion of the container.

Figs. 7 to 10 disclose a modified or alternative form of dispensing cap embodied by the present invention, which is designed for those types of containers which have one of their end walls equipped with a tubular and usually threaded discharge spout, such a container being herein designated by reference numeral 10x and it is shown to be equipped centrally of one end with a threaded dispensing spout or neck 50. This form of dispensing device comprises two essential parts; one being an adapter sleeve 51 that is applied to and secured about the dispensing spout 50 and the other being the dispensing cap which comprises a cylindrical body 53 that is rotatably and slidably fitted about the sleeve 51. The cap is closed at its outer end by a flat end wall 54 from which a dispensing spout 55, like that of the dispenser of Fig. 1, extends.

For sealing purposes, the end wall 54 of the cap is formed centrally of its inside surface with a tapered plug portion 56 adapted to be seated in the outer end of the spout 50 as has been shown in Fig. 7.

Extending upwardly from the interior surface of the cap end wall 54, in reference to its showing in Figs. 7 and 8, and into the container, is a stem 58 with a resilient valve disk 59 formed or fixed thereon. The stem extends into the container coaxially of its spout 50 and the valve disk 59 is movable from and into the outlet to the spout 50 by the longitudinal movements of the cap on the adapter sleeve; this movement of the valve being effected in the same way and for the same purpose as previously explained in connection with the dispenser of Fig. 1.

To retain the dispensing cap on the adapter sleeve 51, the inner surface of its side wall 53 is provided with one or more vertical grooves 62, with each leading at one end, as shown in Fig. 10, into an inclined, circumferentially directed groove 63. Formed on the sleeve 51, and contained in the vertical grooves 62, are lugs 64. When the cap is adjusted to closed position and rotated, these lugs enter the slots 63 and operate to draw the cap tightly to its closed position.

Fig. 13 shows a measuring or metering cap 12x substantially like that of Figs. 7 and 8 except that the spout 55 has been eliminated, leaving the outer end surface of the cap flat, but formed with the discharge or liquid outlet slot 15 at one side and air port 16 at the other as in the previously disclosed devices. Also, in this cap there is a thin walled, cylindrical plug portion 70 formed with encircling corrugations which is slidably contained in the bottle neck. Until time of its use, the openings 15—16 of this form of cap may be kept covered and sealed by means of a plastic tear-off strip, or the like, as designated by numeral 75. The mode of use of the cap in this form is as previously described, and its results are substantially the same. This device is designated as an "overlapping valve" type of device in that the valve disk 59 will be seated to discontinue flow of liquid into the neck portion of the inverted bottle before the plug portion 70 clears entirely the bottle neck to allow discharge through the passage 15. The closure disk 59 seats itself in the bottle neck just prior to the final movement of the plug to open position, then the farther movement that is required to permit outflow from the neck is provided for through the flexibility of the disk 59.

Figure 3:
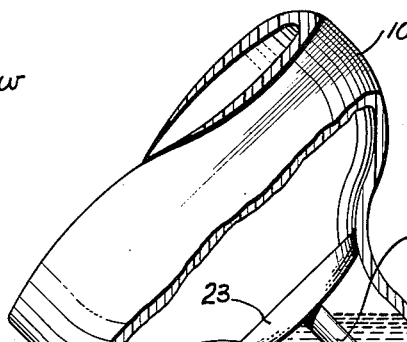
Fig. 3 is a view, similar to that of Fig. 2, but showing the container tipped downwardly as for dispensing, and showing the valve member, that is associated with the cap, closed to prevent flow of liquid from the container into the cap during a dispensing operation.

It will also be mentioned here that the "overlapping" feature of the valve as disclosed in the device of Fig. 13, is present also in the devices of Figs. 3 and 7 in each of which the flexibility of the valve disk, after it seats itself in the bottle neck, permits the additional movement of the closure cap that is necessary to fully open the discharge port or outflow passage.

Any one of the several devices herein shown provides a relatively inexpensive, easy to use, effective and practical means for the quick dispensing of predetermined measured amounts of liquid. The provision herein made for easy reciprocal action of the measuring cap on the container neck provides that the designated quantities may be received into the cap and dispensed successively, if such should be desired, merely by the closing and opening movements of the cap on the container neck, first to permit it to fill and then to dispense, without requiring that the container be turned back to an upright position after each dispensing operation.

The devices as shown are relatively inexpensive to manufacture and easy to apply.

What I claim as new is:

1. In combination, a container having a body, a cylindrical, elongated, up-standing discharge neck integrally formed and projecting above the body and open to its full interior diameter at both ends, said neck being of substantially reduced cross-sectional area in comparison to the cross-sectional area of the body; a dispensing cap slidably mounted on the free end of said discharge neck, said dispensing cap comprising a straight cylindrical sidewall portion and end wall integral with said sidewall, the interior diameter of said cap being greater than the exterior diameter of said neck whereby the cap is freely movable on said neck, a post affixed to the interior surface of said end wall and projecting at right angle thereto, a valve secured to the free end of said post and positioned within said body adjacent the neck, said valve being adapted, incident to the outward movement of said cap, to sealingly engage said body adjacent said neck, a dispensing slot formed in the endwall of said cap adjacent the sidewall thereof, said slot being arcuately shaped and conforming to the curvature of the free end of said neck whereby the neck, when engaged with the end wall of the cap, closes said slot and an air port formed in said end wall adjacent the sidewall and diametrically opposed from said slot whereby the port will be closed by engagement of the neck with said end wall.

2. A combination as in claim 1 including a spout secured to said end wall about said slot and extending outwardly therefrom.

References Cited in the file of this patent
UNITED STATES PATENTS

| | | |
|---|---|---|
| 564,209 | Meins | July 21, 1896 |
| 1,083,552 | McCord | Jan. 6, 1914 |
| 1,796,785 | Harding | Mar. 17, 1931 |
| 1,988,865 | Campbell | Jan. 22, 1935 |
| 1,989,145 | Newby | Jan. 29, 1935 |
| 2,111,186 | Jenks | Mar. 15, 1938 |
| 2,449,285 | Ekstrom | Sept. 14, 1948 |
| 2,722,345 | Van Buren | Nov. 1, 1955 |
| 2,828,893 | Stewart et al. | Apr. 1, 1958 |